United States Patent [19]
Hadley

[11] Patent Number: 5,796,032
[45] Date of Patent: Aug. 18, 1998

[54] ELECTRIC WIRE INSULATING COVER INSPECTION DEVICE

[76] Inventor: William A. Hadley, 15267 75th Way North, Palm Beach Gardens, Fla. 33418

[21] Appl. No.: 858,747

[22] Filed: May 19, 1997

[51] Int. Cl.$^6$ .................................................. H01B 17/00
[52] U.S. Cl. ....................... 174/5 R; 174/40 R; 174/135; 174/156
[58] Field of Search ................ 174/5 R, 40 R, 174/136, 138 F, 138 R, 156, 157, 135; 29/825, 745, 758, 239; 269/3, 95, 287, 289 R, 309; 24/72.1

[56] References Cited

U.S. PATENT DOCUMENTS

| | | | |
|---|---|---|---|
| 1,435,311 | 11/1922 | Knight | 138/110 |
| 1,485,994 | 3/1924 | Salisbury | 174/5 R |
| 1,988,435 | 1/1935 | Beebe | 174/52 |
| 1,988,604 | 1/1935 | Merrill | 174/5 R |
| 3,900,697 | 8/1975 | Yotsugi | |

Primary Examiner—Bot L. Ledynh
Assistant Examiner—Dhiru R. Patel
Attorney, Agent, or Firm—McHale & Slavin, P.A.

[57] ABSTRACT

A device for opening of an electrical wire insulating cover allowing access to the interior walls of the insulating cover for purposes of inspection or cleaning. A preferred embodiment teaches a one piece rigid structure formed from a first wall having a semi-circular longitudinally rolled shape spaced apart from a second sidewall having a mirror shaped semi-circular longitudinally rolled formation wherein each sidewall forms a partial cavity allowing for placement of the leading edge of an electric insulating cover. The sidewalls are spaced apart by use of either an adjustable or fixed saddle portion which is used in biasing the outer surface of the insulating cover while the leading edges of the cover are placed within partial cavities. Upon placement, the insulating cover is maintained in an open position allowing inspection of the interior chamber.

9 Claims, 3 Drawing Sheets

DETAIL "A"

ELECTRIC WIRE INSULATING COVER INSPECTION DEVICE

FIELD OF THE INVENTION

This invention relates to the field of insulating covers for electric wires and, in particular, to a device for use in accessing the interior chamber of an insulating cover for purpose of inspecting and/or cleaning the chamber.

BACKGROUND OF THE INVENTION

The reliance of electricity to operate residential, commercial, and industrial devices has become commonplace and in many instances, taken for granted. However, the ability to generate electricity and transmit electricity over a long distance requires the use of specialized electric cables that pose hazardous situations in some instances. In such instances the use of insulators lessen the hazardous situation, if the insulator is maintained.

Electricity is preferably transferred at a high voltage which lessens the amount of current needed for movement and lessen the associated current loss. For example, a typical generating plant has multiple generators, each capable of delivering between 10,000 and 26,000 volts. This voltage is stepped up by use of a transformer to a range anywhere from 200,000 to 800,000 volts for transfer through a primary transmission line. Voltage at a sub-station may be stepped down below 150,000 volts and then stepped down to a single distribution level anywhere from between 2 and 33 kilovolts. Transformers at the end of the distribution lines provide a point of use voltage, typically 120 or 240 volts.

The use of high voltage solid state rectifiers allow for the conversion of the alternating current to direct current for purposes of power distribution which avoids capacitive inductive losses during transmission. This use of direct current for power distribution provides higher efficiency, but necessitates the needs for insulating of wires to prevent short circuiting with a grounded source.

High voltage transmission wires are typically constructed from aluminum, aluminum clad steel, copper, or a copper clad material and suspended from tall structures by use of porcelain or the like, non-conductive insulators. Lower voltage transmission lines are typically held by use of wooden or cement poles high above the ground.

One of the problems with transmission wires placed above ground is the ability of the wires to be shorted to ground by trees, animals, and humans that bridge the isolators. In addition, such wires are exposed to the environmental elements. For example, a transmission cable may be placed between two steel structures wherein it is exposed to the elements including rain, sun, ozone, high winds, and impact from flying debris such as tree branches. Use of steel clad wiring allows for a large span between support poles wherein the wire can be moved by the wind constantly causing stress on the wire. In many instances, the wire is not encapsulated due to the distances wherein a simple porcelain insulator may be used with provisions to prevent contact with the wires. However, in many areas insulated covers are required to prevent contact with debris or otherwise protect the wires. These covers are then exposed to the same environmental elements.

The need for insulating covers is well known and the subject of multiple patent applications including U.S. Pat. No. 3,900,697 which discloses an electric wire insulating cover. This disclosure exemplifies the prior art and sets forth variations of the prior art cited, all of which teach an encapsulated type insulating cover that is around an electrical wire for use on high voltage lines. This is especially beneficial when the lines are placed adjacent to structures, trees, and so forth so as to prevent the wires from short circuiting which could lead to electric shock, fire, or death if the lines are breached by a human or animal. As the high voltage lines are direct current, an animal may bridge a porcelain insulator causing a direct contact with the voltage line in the ground. The direct current operates as a magnet and would cause the electrocution of the animal with no means for escaping.

The problem, to which this invention addresses, is the need to inspect the wires secured therein as well as the integrity of the electric wire insulating cover. Over a period of time, metal oxides or other debris may accumulate in the housing leading to shorting of electricity outside the cover, effectively eliminating the protection originally afforded by the cover. The shape of the electric wire insulating cover is such that an overlap is used which first assists in insertion of the wire and further operates as a seal so as to inhibit moisture or other debris from entering the interior chamber of the cover.

The current practice in opening an insulating cover is to pry the cover open with pliers, screwdrivers, crowbars, or any other object capable of providing leverage. When the cover is opened, the tabs of the cover are bent back and grasped by use of a vice grip c-clamp or manually held open by another individual. This process can damage the cover and presents the operator with a hazardous situation as the cover is formed in a resealing position and attempts to constantly reseal, which may harm an individual's fingers if it closes while they are cleaning the interior. The wire insulating cover may be large and in many instances over a foot in diameter wherein the biasing force is also increased.

Thus, what is lacking in the art is a device capable of opening an electric wire insulating cover so as to allow inspection of the interior chamber, wherein the device will not damage the cover and maintains the cover in an open position to allow for cleaning thereof.

SUMMARY OF THE INVENTION

Disclosed is a device for use in safely inspecting the interior chamber of an electric wire insulating cover further maintaining the cover in an open position to allow cleaning thereof. The preferred embodiment of the instant invention is constructed from a single piece rigid plastic having a first sidewall formed into a semi-circular longitudinally rolled structure and a second separator sidewall spaced apart from the first sidewall which forms a mirror image thereof. Each sidewall has an insertion end spaced apart from the longitudinal length of the rigid structure with each sidewall forming a partial cavity. A corner of the insertion end may be chamfered to further allow attachment to the insulating cover.

Alternatively, each sidewall may be formed separately wherein a base or saddle section maintains each insertion edge in a spaced apart position, made adjustable so as to accommodate various sized insulation covers. In this embodiment each sidewall maintains a semi-circular shape again to eliminate sharp edges. Each sidewall forms a partial cavity receptive to the leading edge of the electric wire insulating cover. The leading edge is insertable into the partial cavity with the insertion edge of the device engaging a portion of the inner surface of the insulating wire cover so as to maintain the cover in an open position.

Thus, an object of the instant invention is to teach the use of a device for safely opening an electric wire insulating cover. The device allows for inspection and cleaning of the internal chamber formed by the cover so as to remove metal oxides and related debris to prevent electrical tracking and the associated safety risk.

Another object of the instant invention is to provide a portable inspection device that is non-destructive having no sharp edges or metallic materials that may cause injury.

Still another object of the instant invention is to set forth a particular shape that allows for ease of opening electric insulating covers by a single operator and maintaining said covers in a secure open position.

Another object of the instant invention is to disclose a device for opening of electric wire insulating covers that may be placed in a vise or similar device allowing use for various sized insulating covers.

Still another object is to disclose the use of a single piece structure that is inexpensive to manufacture and may include a chamfered leading insertion edge so as to assist an initial opening of the insulating cover.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
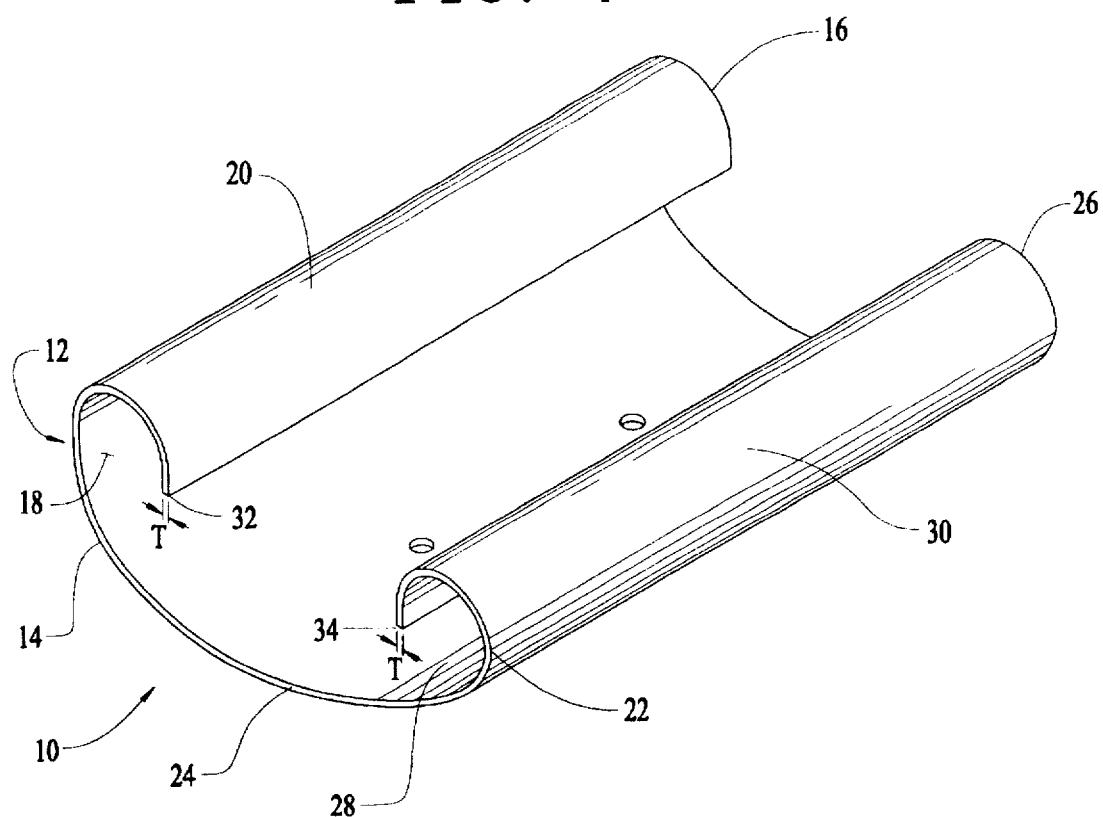
FIG. 1 is a perspective view of the instant invention.
Figure 4:
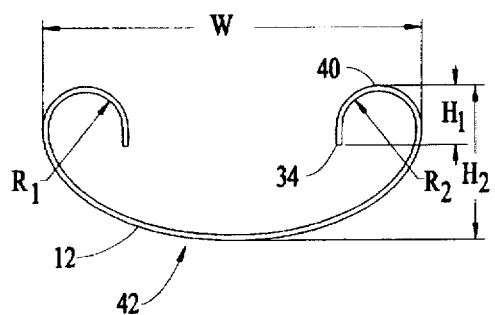
FIG. 4 is an end view.
Figure 5:
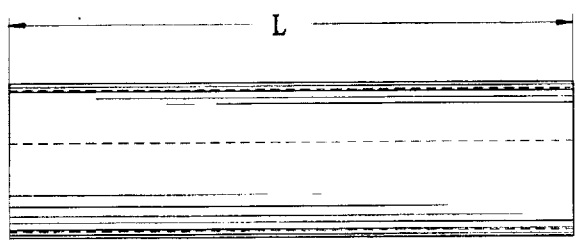
FIG. 5 is a side view.

Now referring to FIGS. 1, 4 and 5 the instant invention is disclosed for use in opening an electrical wire insulating cover thereby allowing access to the interior walls of the cover for purposes of inspection or cleaning. The device 10 consists of a first separator side wall formed from a rigid plastic or the like non-conductive material having a front end 14 and back end 16 forming a longitudinal length with an inner surface 18 and an outer surface 20 defining a thickness T therebetween. A preferred embodiment has a thickness T between ⅛ and ½ inch to accommodate a majority of the insulating wire covers currently available in the marketplace. Actual thickness is dependent on the rigidity of the cover and the need for strength of the device for maintaining the device in an open position.

The length L between front end 14 and back end 16 is approximately 12 inches which allows a sufficient area for inspection and cleaning while limiting the amount of frictional engagement required in opening of the cover. It should be noted that a smaller length will facilitate opening of an electric cover while limit the amount of working area available. In addition, the use of a larger length provides a greater working space but may create difficulty in opening due to the associated friction. A light lubricant added to the insertion edge may assist in opening large covers, although the lubricant recommended would be either a water soluble glycerine or environmentally safe soap that could be easily rinsed from the cover before closure.

A second separator sidewall 22 is similarly formed from a rigid or same structure having a front end 24 and a back end 26 forming the longitudinal length. An inner surface and an outer surface 30 forms a thickness T' equaling the thickness of the first separator sidewall. A base section means, not shown in FIG. 1, is used for maintaining the first insertion edge 32 apart from second insertion edge 34 a fixed distance. The base section means may consist of an adjustable vise wherein the first separator sidewall 12 is coupled to one side of an adjustable vise and the second separator sidewall 22 secured to the second side of the adjustable vise. In this manner the vise may be opened or closed so as to accommodate various sized insulating covers. Alternatively, the preferred embodiment is to use a single piece of material with the first separator sidewall 12 spaced apart from an equally shaped second separator sidewall 22 and the device is simply bolted to a platform in a non-adjustable format.

The first separator sidewall 12 has a radius $R_1$ of approximately one inch with a ⅞ inch extension on the open end. Radius $R_2$ forms a mirror image of Radius$_1$ with a height between insertion end 34 and the top 40 of the outer service 30 having a height $H_1$ of approximately 1.875 inches. The overall height from the bottom of saddle 42 to top surface 40 is $H_2$ of approximately 3.5 inches. The width W of the preferred embodiment having a fixed base section formed from a base section from a single piece of material as set forth in FIG. 4 is approximately 8.5 inches.

Figure 2:
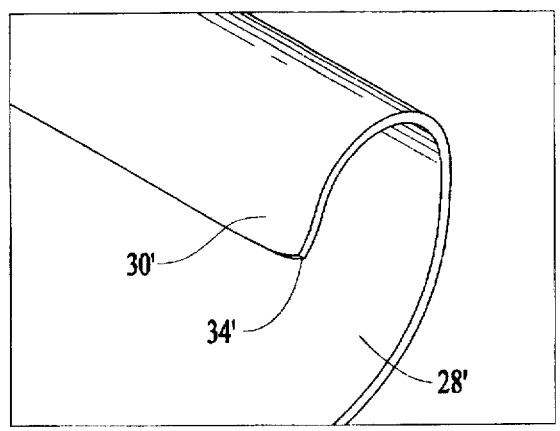
FIG. 2 is an optional embodiment of the insertion edge of the instant invention.

FIG. 2 shows insertion edge 34 prime showing a slight camper between outer surface 30 prime and inner surface 28 prime which assists in the installation of the cover onto the device by reducing the amount of opening required by the cover in order to place the leading edge of each cover within the partial chambers formed within semi-circular portion of the device.

Figure 3:
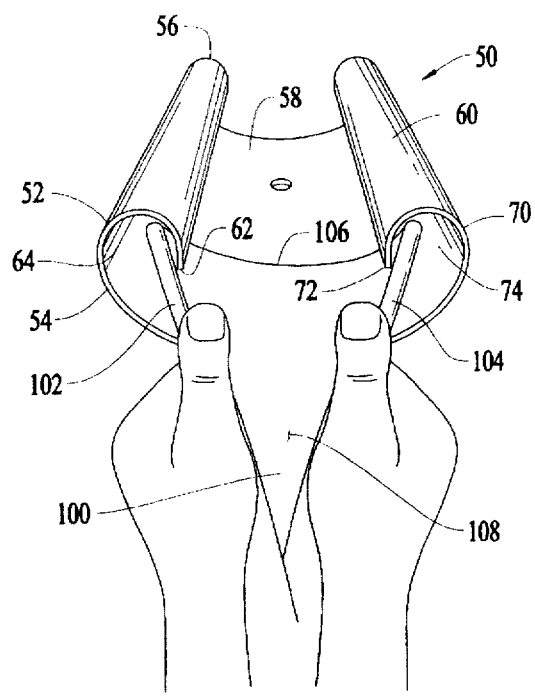
FIG. 3 is a pictorial view of an insulating cover being forced open by the instant invention.

Referring now to FIG. 3 set forth is the preferred embodiment of the instant invention 50 consisting of a one piece rigid structure defined by a first separator sidewall 52 or from a semi-circular longitudinally rolled structure with a front end 54, a back end 56 with an inner surface 58 and an outer surface 60. The first sidewall has an insertion edge 62 spaced apart from said inner surface allowing the edge 102 of an electric insulation cover 104 placed within the formed partial cavity 64 located along the inner surface 48 within the first separator sidewall. The second separator sidewall 70 is spaced apart from said first sidewall forming a mirror image thereof. The second separation sidewall having an insertion edge 72 also spaced apart from the inner surface 58 forming cavity 74 allowing for insertion of the second edge of 104 of the insulating cover 100.

In operation the insulating cover is placed onto the device 50 along leading edge 106 of the insulating cover 100 so as to allow placement of first side edge 102 within partial chamber 64 and second edge 104 into chamber 74. The outer surface of insulating cover 100 biasing against the inner surface 58 of the device. The insulating cover is then slid along the partial cavities allowing for inspection of the interior surface 108 of the cover 100 further allowing for easier cleaning without the need of any other type to maintain the cover in an open position.

Figure 6:
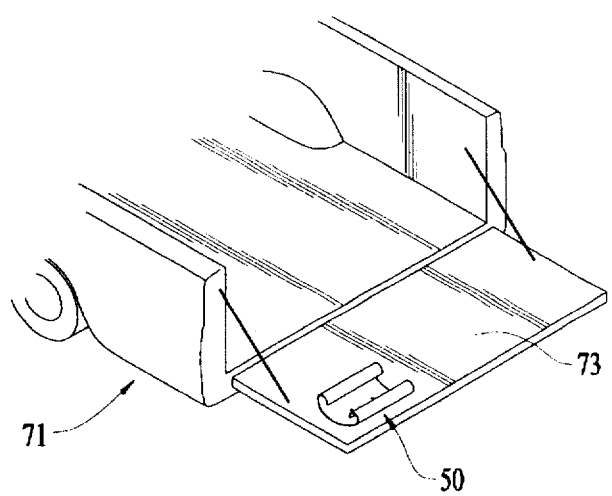
FIG. 6 is a pictorial view of the device installed on a tailgate of a truck.

Referring now to FIG. 6, shown is a pictorial of a pick-up truck 71 having tailgate 73 with the device 50 mounted onto the tailgate illustrating the portability of the device. The truck 71 may be taken to a job site and the insulating cover spread open across the tailgate which provides the support and secure base for inspection and/or cleaning.

Figure 7:
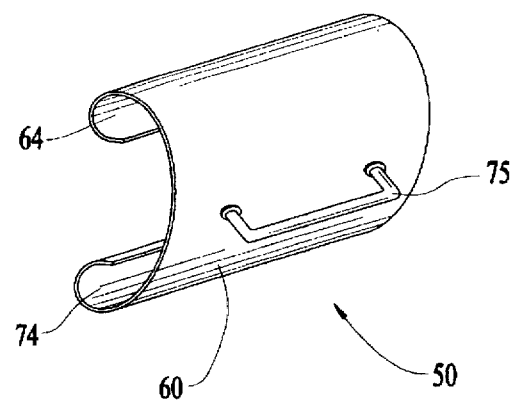
FIG. 7 is a perspective view of the device having a handle.

FIG. 7 depicts the device 50 wherein handle 75 is secured along the outer surface 60 of the device 50. The handle 75 allows for manual opening of the cover by sliding the device 50 along the cover thereby exposing the interior chamber as the cover engages the partial cavities 64 and 74.

Figure 8:
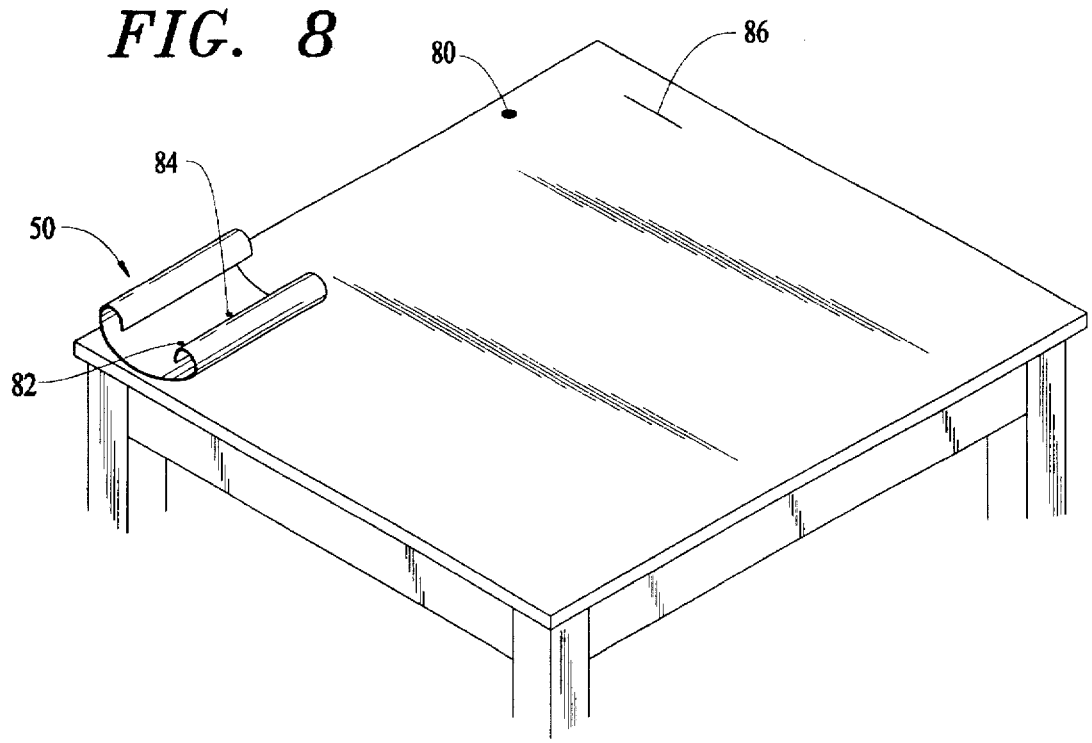
FIG. 8 is a pictorial view of the device attached to a work table.

FIG. 8 is a pictorial of a workbench 80 having the device 50 secured thereto by use of engagement bolts 82 and 84. The bolt releaseably attaches the cover to the upper surface 86 of the table 80. This worktable may be carried to a job site if needed and illustrates the compact size and portability of the device.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A device for opening of an electric wire insulating cover allowing access to the interior walls of the cover for purposes of inspection or cleaning, said device comprising:

a first separator sidewall formed from a rigid structure having a front end and a back end forming a longitudinal length and an inner surface and an outer surface defining a thickness therebetween, said first sidewall having a first insertion edge spaced apart from said inner surface in a semi-circular shape forming a partial cavity;

a second separator sidewall formed from a rigid structure having a front end and a back end forming a longitudinal length and an inner surface and an outer surface defining a thickness therebetween equal to said first sidewall, said second sidewall having a second insertion edge spaced apart from said inner surface in a semi-circular shape forming a partial cavity;

a base section means maintaining said first insertion edge in a spaced apart position from said second insertion edge;

wherein said insertion edges engage the interior walls of said electric wire insulating cover with a portion of said insulating cover insertable into said partial cavities for maintaining said insulating cover in an open position.

2. The device according to claim 1 wherein said first sidewall and said second sidewall are formed integral to said base section means.

3. The device according to claim 1 wherein each said insertion edge is evenly spaced apart an inner sidewall forming a mirror image thereof.

4. The device according to claim 1 wherein each said insertion edge includes a chamfered portion curved outward for ease of mounting said insulation cover.

5. The device according to claim 1 wherein each said sidewall and said base section are constructed from a single piece of non-metallic material.

6. A device for opening of an electric wire insulating cover allowing access to the interior walls of the cover for purposes of inspection or cleaning, said device comprising:

a one piece rigid structure defined by a first separator sidewall formed from a semi-circular longitudinally rolled shape having a front end and a back end forming a longitudinal length and an inner surface and an outer surface defining a thickness therebetween, said first sidewall having a first insertion edge spaced apart from said inner surface wherein said inner surface forms a partial cavity;

a second separator sidewall spaced apart from said first sidewall forming a mirror image of said first sidewall, said second sidewall having a second insertion edge spaced apart from an inner surface forming a second partial cavity;

wherein said insertion edges engage the interior walls of said electrical wire insulating cover with a portion of said insulating cover insertable into said partial cavities for maintaining said insulating cover in an open position.

7. The device according to claim 6 wherein each said insertion edge includes a chamfered portion curved outward for ease of mounting said insulation cover.

8. The device according to claim 6 wherein said rigid structure is non-metallic.

9. The device according to claim 8 wherein said rigid structure is plastic.

* * * * *